United States Patent Office 3,427,298
Patented Feb. 11, 1969

3,427,298
POLYVINYL ALCOHOL MATERIALS
AND COMPOSITIONS
Kiyoshi Tsuboi and Takani Mochizuki, Kurashiki, Japan, assignors to Kurashiki Rayon Co., Ltd., Okayama Prefecture, Japan, a corporation of Japan
No Drawing. Filed Feb. 25, 1964, Ser. No. 352,711
Claims priority, application Japan, Mar. 11, 1963, 38/12,386, 38/12,387, 38/12,388, 38/12,389; Mar. 23, 1963, 38/15,116
U.S. Cl. 260—91.3    35 Claims
Int. Cl. C08f 47/03, 27/16; D01f 7/06

ABSTRACT OF THE DISCLOSURE

Polyvinyl alcohol crystals having a crystal habit, that is, a high degree of crystallinity and containing substantially no amorphous regions. The crystals have a generally plate-like parallelogram structure and individual crystal dimensions are about $0.5\mu$ to about $1\mu$ in width, about $2\mu$ to about $5\mu$ in length, and about 100 A. to about 300 A. in thickness. The polyvinyl alcohol crystals are prepared by forming a uniform solution of polyvinyl alcohol in either a polyhydric alcohol or an acid amide and then precipitating the crystals. The method and product are suitable for use in the manufacture of fibers and shaped products.

This invention relates to novel types and novel forms of polyvinyl alcohol and materials containing the novel polyvinyl alcohol and methods of preparing the novel polyvinyl alcohol and methods of preparing shaped products of polyvinyl alcohol, and is more particularly concerned with polyvinyl alcohol having a high degree of crystallinity and having a specific form, and is also concerned with methods and procedures for preparing polyvinyl alcohol having a high degree of crystallinity.

It is well-known in the prior art that polyvinyl alcohol exhibits crystalline characteristics and polyvinyl alcohols having varying degrees of crystallinity have been prepared. When the polyvinyl alcohol of the prior art or the conventional or ordinary polyvinyl alcohol is examined utilizing X-ray diffraction techniques, there are observed in the X-ray diffraction patterns obtained, blurred diffraction rings or reflections. These blurred diffraction rings in the X-ray diffraction patterns of the conventional polyvinyl alcohols are due to the presence of liquid type materials or liquid type portions or liquid type regions in the ordinary polyvinyl alcohol. These observed reflection characteristics of the X-ray diffraction patterns of ordinary polyvinyl alcohol indicate that the ordinary polyvinyl alcohol contains non-crystalline areas or amorphous regions or amorphous portions. It has been found and has been observed that these amorphous regions or non-crystalline portions of polyvinyl alcohols prepared in the conventional manner have a high degree of chemical reactivity and these amorphous regions of the conventional polyvinyl alcohols have a low degree of water resistance and are readily soluble in water. The properties and characteristics of the amorphous regions of conventional polyvinyl alcohols are entirely different from the properties and characteristics of the crystalline portions of the conventional polyvinyl alcohols.

The presence or existence of amorphous regions in the conventional polyvinyl alcohol presents problems and difficulties when one utilizes the conventional polyvinyl alcohol; and because of these amorphous regions in the polyvinyl alcohol, difficulties are encountered when one utilizes the polyvinyl alcohol to prepare shaped product forms. For example, in the commercial production of polyvinyl alcohol fibers one normally has to subject the polyvinyl alcohol fibers to a treating procedure to increase the degree of crystallinity of the polyvinyl alcohol fiber. The presence of amorphous regions in the conventional polyvinyl alcohol adversely affects these treating procedures and prevents the preparation of polyvinyl alcohol fibers having a high degree of crystallinity. Typically, the polyvinyl alcohol fibers are prepared by spinning techniques and after the spinning step the fiber is elongated in order that the orientation of the polyvinyl alcohol molecules in the fiber be increased to obtain a higher degree of crystallinity; or the polyvinyl alcohol fibers may be heated in order to modify the molecule alignment of the polyvinyl alcohol molecules to increase the degree of crystallinity. It is possible to treat the prepared polyvinyl alcohol fiber by using both the elongation treatment and the heat treatment. However, whether a single treatment or a multiple treatment is used, it is still impossible to obtain a polyvinyl alcohol shaped product form having a very high degree of crystallinity. Generally, the highest degree of crystallinity that has been obtained or reported has been about 70%, that is, the crystalline regions of the polyvinyl alcohol amount to about 70% by weight based on a total weight of the polyvinyl alcohol and the amorphous regions amount to about 30% by weight based on the total weight of polyvinyl alcohol.

Known solvents for polyvinyl alcohol include water, a mixture of water and phenol, dimethyl sulfoxide and ethylene diamine. If polyvinyl alcohol is dissolved in these solvents or other solvents and polyvinyl alcohol solids are recovered by concentration of the solution to obtain solidification or the use of precipitating agents, the recovered polyvinyl alcohol will not have a very high degree of crystallinity as indicated by the observed blurred diffraction rings in the X-ray diffraction patterns; and it is not possible to obtain a polyvinyl alcohol having a degree of crystallinity greater than about 70% by weight. There are no procedures described or disclosed in the prior art whereby solvent techniques can be used to increase the degree of crystallinity of polyvinyl alcohol.

Further, the polyvinyl alcohol molecules have a large number of hydroxyl groups which results in the polyvinyl alcohol molecules having an extremely high polarity. This high polarity results in attraction or interaction among the polyvinyl alcohol molecules and this attraction of the molecules is so strong and active that one cannot convert polyvinyl alcohol solids to a viscous state by heating the polyvinyl alcohol solids. If polyvinyl alcohol solids are heated to a high temperature and then cooled, the degree of crystallinity of the polyvinyl alcohol will not be increased to a value higher than about 70%. Also, if polyvinyl alcohol is heated to an unusually high temperature and to the point where it starts melting, the degree of crystallinity of the polyvinyl alcohol will be reduced. At the present time there are no satisfactory methods of treating polyvinyl alcohol whereby the polyvinyl alcohol will have its degree of crystallinity increased to the maximum extent so that no amorphous regions or amorphous areas exist in the polyvinyl alcohol. Further, there have been no suggestions or disclosures of any method or procedure whereby the amorphous regions can be eliminated in polyvinyl alcohol.

Polyvinyl alcohol solids or polyvinyl alcohol particles are not readily reduced in particle size and it is difficult to prepare extremely fine particles of polyvinyl alcohol solids utilizing the conventional particle size reduction techniques. Conventional polyvinyl alcohol solids do not consist entirely of crystalline regions or crystalline parts; but conventional polyvinyl alcohol contains a considerable amount of non-crystalline portions or amorphous regions. Because of these characteristics of the conventional or ordinary polyvinyl alcohol, the conventional polyvinyl alcohol solids are not readily reduced in particle size and are not easily ground or pulverized. Conventional polyvinyl alcohol materials, including polyvinyl alcohol in the form of fibres which usually have the highest degree of crystallinity, do not have a degree of crystallinity greater than about 70%; when the materials having the highest degree of crystallinity are examined by utilizing X-ray diffraction techniques. The polyvinyl alcohol in fiber form generally has more than about 30% by weight of amorphous regions and the blurred portions of the X-ray diffraction patterns of these conventional polyvinyl alcohols are clear indications of the existence of amorphous regions in the polyvinyl alcohol.

Prior art procedures for the preparation of polyvinyl alcohol solids or polyvinyl alcohol powders have involved preparation of polyvinyl alcohol by saponification of polyvinyl esters, as polyvinyl acetate, polyvinyl formate, and polyvinyl trifluoroacetate. The polyvinyl alcohol was prepared in solution form or the polyvinyl alcohol was dissolved in a solvent. Polyvinyl alcohol solids were then obtained by adding a non-solvent for the polyvinyl alcohol, such as ethyl alcohol or acetone, to the solution which resulted in the separation of polyvinyl alcohol solids. These prior art procedures required very low concentrations of the polyvinyl alcohol in the solution and this presented problems and difficulties, in that large quantities of the polyvinyl alcohol solvent were required and large quantities of the non-solvent to obtain separation of the polyvinyl alcohol are required. Utilizing these prior art procedures makes it extremely difficult to prepare polyvinyl alcohol powders or solids having a small particle size, and it is extremely difficult to reduce the particle size of these polyvinyl alcohol solids to obtain extremely fine powders of polyvinyl alcohol. Further, the polyvinyl alcohol produced by these prior art procedures have an extremely low degree of crystallinity and the X-ray diffraction patterns obtained from these prior art polyvinyl alcohols contain only about 2 or 4 X-ray diffraction lines, indicating a low degree of crystallinity. Because of this low degree of crystallinity, these polyvinyl alcohols have poor water resistance and are readily soluble in water tend to dissolve even in cold water. Because of these poor properties one is not able to use these polyvinyl alcohol solids for a wide variety of uses where it is desirable to use polyvinyl alcohol solids, especially in the form of extremely fine particles.

In order to increase the water resistance and the degree of crystallinity of these polyvinyl alcohol solids, they are usually heated in air with heating temperatures higher than about 100° C. These heating procedures, however, have adverse affects on the polyvinyl alcohol in that a high degree of oxidation of the polyvinyl alcohol occurs and as a result this is not a satisfactory commercial method for increasing the water resistance and degree of crystallinity of polyvinyl alcohol.

In many cases microscopic powders or extremely fine particles of high molecular weight polymeric substances are very useful. These microscopic powders are useful in many applications and have wide use and utility in commercial and industrial operations. For example, they are used in the food processing industry and in the manufacture of various types of foodstuffs, and are used in the preparation of cosmetic type materials and in the paint and chemical industry. It is therefore desirable that microscopic powders or very fine particles of polyvinyl alcohol be made available and that methods and procedures whereby polyvinyl alcohol powders having a high degree of crystallinity may be readily and easily reduced to particles having an extremely fine particle size without adverse or detrimental effects on the properties of the polyvinyl alcohol or the degree of crystallinity of the polyvinyl alcohol.

Conventional procedures and methods for the preparation of polyvinyl alcohol shaped product forms, as fiber forming processes or yarn spinning processes for the production of polyvinyl alcohol fibers, have generally utilized a solution of polyvinyl alcohol and water, or a solution of polyvinyl alcohol in a mixture of water and methanol, or a mixture of water and phenol. These spinning solutions or spinning mixtures containing polyvinyl alcohol have certain disadvantages and present problems when they are utilized in the production of polyvinyl alcohol fibers. For example, if these spinning solutions are left standing for a period of time, precipitation or gelatinization of the polyvinyl alcohol will occur. This precipitation is apparently due to the fact that the polyvinyl alcohol molecules present in the spinning solutions combine or form mutual junction points or junction areas, with the result that these solutions containing precipitated materials are unsuitable for use in fiber forming processes. Recently, new methods of preparing polyvinyl alcohol have been developed and have become known, and polyvinyl alcohol having a high degree of stereoregularity has been produced by utilizing a low temperature polymerization or a specific polyvinyl ester in the saponification process. For example, polyvinyl acetate produced by the low temperature polymerization of vinyl acetate monomer, when saponified, will result in a polyvinyl alcohol having a high degree of stereoregularity. However, this type of polyvinyl alcohol having a high degree of stereoregularity has a high degree of water resistance or a low degree of compatibility with water or mixtures of water and methanol, and as a result it is difficult to prepare stable and satisfactory mixtures or solutions of this polyvinyl alcohol for use in the preparation of shaped forms of polyvinyl alcohol.

Further, when utilizing solutions or mixtures of polyvinyl alcohol to form shaped polymer products or plastic products, it has been found that the viscosity values or viscosity characteristics of the spinning solutions containing polyvinyl alcohol are an important factor in connection with the utilization of these mixtures, for example, in the case of a polyvinyl alcohol-water mixture, the upper limit of polyvinyl acetate that may be used is no more than about 50%. Utilizing higher concentrations of polyvinyl alcohol in this mixture makes it practically impossible and extremely difficult to utilize these high concentration mixtures in commercial procedures. Thus, about 50% of the mixture will be water, which is useless in the polymer product or the plastic material prepared from the mixture. Further, large quantities of heat will be required to remove this unwanted water in the process of producing polyvinyl alcohol shaped product forms.

Also, shaped polymer product forms made from these polyvinyl alcohol mixtures will have a low degree of crystallinity, even though polyvinyl alcohol is a crystalline material. Because of this low degree of crystallinity of the polyvinyl alcohol product, the shaped polymer product will have inferior or unsatisfactory physical and/or mechanical properties, and for practical commercial procedures these shaped polymer products will require further treatment to increase the degree of crystallinity. Heat drawing and heat treatment, as well as other procedures, are normally used to increase the degree of crystallinity of the polyvinyl alcohol shaped product form. The X-ray diffraction patterns of these polyvinyl alcohol polymer products are an indication of the degree of crystallinity. Generally, conventionally prepared polyvinyl alcohol fibers, examined immediately after the spinning step, will generally have no more than 2 to 4 X-ray diffraction lines; while polyvinyl alcohol fibers that have been subjected to thermal elongation and heat treatment, when examined utilizing X-ray diffraction techniques, will give X-ray diffraction patterns that contain at least 10 X-ray diffraction lines.

Work has been done on the stereo structure of high molecular weight substances or polymers, and polyvinyl alcohol polymers having a high degree of stereoregularity have been produced. But even these polyvinyl alcohols have disadvantages in that they have poor solubility in known solvents; and it is difficult to prepare homogeneous solutions or to produce shaped polymer products as filaments or films from this stereoregular polyvinyl alcohol. Also, the amount of polyvinyl alcohol that can be utilized in these known solvents is limited. Generally, no more than about 40% by weight of polyvinyl alcohol can be added to the known solvent. If more than this amount of polyvinyl alcohol is used, there is obtained a solution having an extremely high viscosity, with the result that spinning or molding utilizing this solution becomes almost impossible.

In general, the prior art procedures relating to the production of polyvinyl alcohol and polyvinyl alcohol shaped product forms are not entirely satisfactory and problems and difficulties are encountered in preparing specific types of polyvinyl alcohol and polyvinyl alcohol shaped product forms.

It is therefore an object of this invention to provide improved and novel types of polyvinyl alcohol and improved polyvinyl alcohol shaped product forms and improved polyvinyl alcohol articles.

Another object is to provide improved and novel polyvinyl alcohol having definite particle shapes and polyvinyl alcohol solids having an extremely fine particle size, and methods of preparing these polyvinyl alcohol particles.

A further object is to provide improved methods and procedures for the preparation of improved polyvinyl alcohol shaped product forms.

A still further object is to provide polyvinyl alcohols wherein the polyvinyl alcohols have substantially no amorphous regions and methods and procedures for preparing these polyvinyl alcohols.

Another object is to provide methods and procedures whereby polyvinyl alcohol may be produced in a specific solid crystal form and where the solid crystal of polyvinyl alcohol may be easily and readily reduced to an extremely fine particle size.

A still further object is to provide solvents that are useful in preparing uniform solutions of polyvinyl alcohol having a high concentration of polyvinyl alcohol.

A still further object is to provide polyvinyl alcohol solid particles in the form of microscopic powders.

Another object is to provide cosmetic materials, food materials, catalyst support materials, filtration aid materials, coating composition materials, and textile and paper coating materials, utilizing the novel polyvinyl alcohols of this invention.

These and other objects, as well as other advantages and other benefits of this invention and other novel and specific features of this invention, will become apparent, or will be clarified or may be specifically detailed or specifically described, in the following disclosures, illustrations, and examples of this invention.

In accordance with this invention, polyvinyl alcohol is prepared in a novel and advantageous solid form, wherein the polyvinyl alcohol has an extremely high degree of crystallinity and is entirely different than any of the forms of polyvinyl alcohol previously produced. This novel solid polyvinyl alcohol having a high degree of crystallinity is highly useful in industrial and commercial procedures and materials, and has many useful applications. In accordance with this invention it has been found that a solvent technique utilizing certain solvents for polyvinyl alcohol can be used to prepare this novel solid polyvinyl alcohol having an extremely high degree of crystallinity. Solvents useful in the solvent procedures and methods of this invention include polyhydric alcohols and acid amides. In accordance with the invention, the polyvinyl alcohol-solvent mixture is heated to obtain a uniform and clear solution. The novel polyvinyl alcohol is then recovered from this uniform solution. In manufacturing polyvinyl alcohol shaped product forms, as fibers, films, or other plastic products from polyvinyl alcohol mixtures, it has been found that the improved methods and procedures of this invention overcome the deficiencies and problems and difficulties discussed above; and in accordance with this invention it has been found that mixtures prepared from polyvinyl alcohol and polyhydric alcohols have unexpected and valuable advantages and benefits. The polyvinyl alcohol-polyhydric alcohol mixture and the polyvinyl alcohol-acid amide mixture are useful in the manufacture or preparation of shaped polyvinyl alcohol products, as fibers, films, or other plastic materials.

The polyhydric alcohols useful as solvents in the solvent techniques of this invention may be represented by the formula:

$$HO-(C_xH_yO_z)-OH$$

where $x$ is from 2 to 10, $y$ is from 4 to 20, and $z$ is from 0 to 10.

Representative polyhydric alcohols include:

| Formula: | Name |
|---|---|
| $HO(CH_2)_2O(CH_2)_2OH$ | Diethylene glycol. |
| $HO(CH_2)_2OH$ | Ethylene glycol. |
| $HO(CH_2)_3OH$ | 1,3-propane diol. |
| $HO(CH_2)_4OH$ | 1,4-butane diol. |
| $HO(CH_2)_5OH$ | 1,5-pentane diol. |
| $CH_3CHOHCH_2OH$ | 1-methyl ethylene glycol. |
| $HOCH_2CHOHCH_2OH$ | Glycerin. |
| $HO(CH_2)_2O(CH_2)_2O(CH_2)_2OH$ | Triethylene glycol. |

Other polyhydric alcohols include pentamethylene glycol, hexamethylene glycol, tetramethylene glycol, 2,3-butane triol, 1,3-butane diol, 1,2,6-hexane triol, and trimethylol propane. In preparing polyvinyl alcohol crystals of this invention, it is preferred to utilize triethylene glycol, pentamethylene glycol, and hexamethylene glycol.

A single polyhydric alcohol may be used in the solvent techniques of this invention, or a mixture of 2 or more polyhydric alcohols may be used.

The acid amides useful in the procedures of this invention may be represented by the general formula:

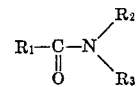

where $R_1$, $R_2$, and $R_3$, are hydrogen or methyl or ethyl radicals.

Representative acid amides include diethyl formamide, dimethyl formamide, methyl ethyl formamide, dipropyl formamide, acetamide, and methyl acetamide. For the preparation of polyvinyl alcohol crystals, diethyl formamide is a preferred solvent.

In general, it has been found that satisfactory and advantageous results are obtained when the polyvinyl alcohol is dissolved in the polyhydric alcohol solvent or acid amide solvent at a temperature within the range of about 120° C. to about 280° C.

The solvent techniques of this invention involve dissolving the polyvinyl alcohol in a polyhydric solvent or an acid amide solvent or in a mixture of two or more solvents and then separating the solution components to obtain a polyvinyl alcohol having a high degree of crystallinity.

Generally, the solvent methods and solvent techniques of this invention, utilizing polyhydric alcohols and acid amides, are applicable to all types of polyvinyl alcohol; including those polyvinyl alcohols having a low solubility in water and having a high degree of stereoregularity, and those polyvinyl alcohols having a high solubility in water and having a low degree of stereoregularity. The solvent preparation techniques of this invention allow polyvinyl alcohol, having a high degree of crystallinity, to be readily and easily produced.

The polyvinyl alcohol useful in the procedures of this invention may have any degree of polymerization, but it is preferred that the polyvinyl alcohol have an average degree of polymerization from about 50 to about 5000. Generally more satisfactory results are obtained when the polyvinyl alcohol, used in the procedures of this invention, has a lower degree of polymerization. Partially saponified or partially acetylated polyvinyl alcohols may be used. It is preferred that the polyvinyl alcohol have a high degree of saponification or a high degree of hydrolysis. Partially saponified polyvinyl alcohols prepared from polyvinyl esters as polyvinyl acetate or polyvinyl formate are useful in the procedures of this invention.

In most cases heating the polyvinyl alcohol-solvent mixture at a temperature below about 120° C. presents problems, in that it is difficult to dissolve the polyvinyl alcohol and satisfactory or uniform solutions of the polyvinyl alcohol and the polyhydric alcohol will not generally be obtained. Further, while in some cases it is possible to operate at temperatures above about 280° C., it is generally undesirable to operate at these high temperatures in that decomposition of the components in the mixture may occur. After the uniform solution of polyvinyl alcohol and solvent has been obtained by the heating procedure, the novel polyvinyl alcohol solids are isolated or recovered from the heated solution. A variety of techniques may be used to obtain the novel form of polyvinyl alcohol having a high degree of crystallinity. One method involves precipitation of the polyvinyl alcohol from the solution in solid form, while another method involves the use of extraction techniques to remove the polyhydric alcohol solvent from the solution. In either case, the polyvinyl alcohol solids are obtained in individual crystal form where these polyvinyl alcohol crystals have a high degree of crystallinity.

To precipitate the polyvinyl alcohol from the heated solution one advantageous method is to cool the solution to a sufficient degree whereby the polyvinyl alcohol will be precipitated from the solution in solid crystal powder form. The degree of cooling required for precipitation of the polyvinyl alcohol crystals may vary somewhat depending on the particular polyhydric alcohol used and the particular temperature that was used to obtain the uniform solution.

Extraction techniques are also useful to obtain the polyvinyl alcohol crystals. The extraction technique involves the addition of an extraction solvent to the heated solution and where the extraction solvent is a non-solvent for the polyvinyl alcohol, or the heated solution of polyvinyl alcohol and polyhydric alcohol is added to the extraction solvent that has been heated to a temperature about equal to that of the heated solution of polyvinyl alcohol. This extraction procedure results in the preferential extraction of the polyhydric alcohol in the solution and the polyvinyl alcohol separates in the solid crystal form or crystal shape. For example, a solution of polyvinyl alcohol and a polyhydric alcohol at a temperature of about 160° C. is added to a large quantity of extraction solvent that has been heated to about 160° C. under pressure. As a result, the extraction solvent will preferentially extract the polyhydric alcohol from the solution and the polyvinyl alcohol will separate as a solid crystal. Organic solvents are useful as the extraction solvent and include methanol, ethanol, and propanol. The polyvinyl alcohol solid crystals having a high degree of crystallinity produced by the procedures of this invention are white colored plate-shaped crystals that may be easily reduced in particle size or pulverized by mechanical friction or impact. This property of being able to be pulverized readily is a property that is not observed or found with the ordinary or conventional polyvinyl alcohol solids that contain amorphous regions. The polyvinyl alcohol crystal particles obtained by this invention and the polyvinyl alcohol powders that have been obtained by particle size reduction of the crystals are tasteless, odorless, white colored microscopic powders, and are useful as cosmetics and a base material for cosmetics, a food additive or food component, a base agent for chemicals, filtration aids, catalyst supports, paper materials for coating compositions or paints and coating agents for paper or coating agents for textiles.

The polyvinyl alcohol crystals may be easily reduced to a solid particle size or microscopic granules of 350 mesh or more.

The mixture of polyvinyl alcohol and acid amide is heated to a sufficiently high temperature whereby the polyvinyl alcohol dissolves and a uniform solution is obtained. The solid crystal polyvinyl alcohol is obtained by cooling the heated solution or removing the acid amide solvent from the solution. Cooling allows the polyvinyl alcohol to precipitate from the acid amide solution and it is recovered by filtration. The polyvinyl alcohol crystals may be obtained by distilling the acid amide from the solution under a reduced pressure. Generally heating temperatures over about 140° C. are preferred, in order to obtain complete dissolution of the polyvinyl alcohol, and when cooling procedures are used, the heated solution should be cooled to a temperature lower than about 10° C. below the temperature at which the polyvinyl alcohol was dissolved.

It has been found that polyvinyl alcohol having a high degree of polymerization may be readily dissolved in a class of acid amides. Generally at a temperature up to about 120° C. the acid amide solvent will have no effect on polyvinyl alcohol and polyvinyl alcohol will not dissolve in the acid amide at a temperature below about 120° C. However, if the acid amide solvent and polyvinyl alcohol mixture is heated at temperatures higher than about 120° C., complete dissolution takes place and polyvinyl alcohol crystals having a high degree of crystallinity may be precipitated. For example, polyvinyl alcohol may be readily and easily dissolved in diethyl formamide by heating the polyvinyl alcohol-diethyl formamide mixture to a temperature of about 205° C. When this solution is cooled to about 180° C. the polyvinyl alcohol will be obtained in crystal form. Utilizing dimethyl formamide as the solvent, heating to a temperature of about 150° C. will give complete dissolution.

The individual crystals of polyvinyl alcohol obtained vary in crystal size somewhat, but have the same general plate-like or regular shape of a parallelogram; generally the crystal dimensions are about $0.5\mu$ to about $1\mu$ in width, about $2\mu$ to about $5\mu$ in length, and about 100 A. to about 300 A. in thickness.

The external form of crystal observed from above is shown in a thick line, while black circles are obtained in the electron diffraction image when the electron beams are projected perpendicular to a plane perpendicular to the plate. The observed black circles are located in the lattice point of the reciprocal lattice of the polyvinyl alcohol crystal shown by a thin solid line. Evaluation of the electron diffraction images indicates that the individual polyvinyl alcohol crystal is a perfect single crystal. The polyvinyl alcohol crystal has a crystal habit which is bounded by a (100) plane and a (101) plane and an (020) plane. These three crystal planes are not observed on the external surface of ordinary or conventional polyvinyl alcohol articles and the regular crystal shape of the novel polyvinyl alcohol crystals of this invention have not been previously obtained. Because of these polyvinyl alcohol crystals being perfect single crystals in contrast to the previously known polyvinyl alcohol materials, this novel crystal form of polyvinyl alcohol may be easily and readily reduced in particle size to extremely fine powders having a particle size of more than 350 mesh.

The polyvinyl alcohol crystals may be prepared by removing the acid amide from the uniform solution by distillation at reduced pressures.

Generally it is preferred to use polyvinyl alcohol having a high degree of hydrolysis or a high degree of saponification in the procedures of this invention. However, beneficial and advantageous results are also obtained when partially hydrolyzed or acetylated polyvinyl alcohols are used. Also, polyvinyl alcohol having a high degree of stereoregularity may be used and polyvinyl alcohol having a high degree of polymerization may be used.

It is possible by modifying the ratio of components in the polyvinyl alcohol-acid amide mixture to vary somewhat the degree of crystallinity in the polyvinyl alcohol crystals and it is also possible to vary the size of the individual crystals. Generally, it is preferred that the concentration of polyvinyl alcohol in the mixture be in an amount not in excess of about 85% by weight of the mixture. Operating at polyvinyl alcohol concentrations greater than about 85% may present practical difficulties as in difficulties and problems in mixing the polyvinyl alcohol and the acid amide to obtain a uniform mixture.

The acid amide solvent may be removed from the uniform solution by distillation under reduced pressures or by extraction techniques with an extraction solvent for the acid amide; for example, ethanol may be used as an extraction solvent.

This invention also relates to a mixture of polyvinyl alcohol powders where the polyvinyl alcohol powders are in the form of plate shaped crystals. Conventional polyvinyl alcohol solids do not consist entirely of crystalline regions or parts, but this conventional polyvinyl alcohol contains a considerable amount or a considerable degree of non-crystalline portions or non-crystalline parts. Because of the crystalline characteristics of the conventional polyvinyl alcohol, the solid form of conventional polyvinyl alcohol may not be readily reduced in particle size or may not be ground or pulverized easily. The polyvinyl alcohol polymeric materials of this invention contain substantially no non-crystalline regions or non-crystalline parts; and the polyvinyl alcohol polymeric materials of this invention consist of crystals that are white in color and have a plate shape and which may be pulverized easily or readily ground into polyvinyl alcohol solids having a fine particle size.

The novel white, plate-shaped crystals of polyvinyl alcohol powder are prepared by dissolving polyvinyl alcohol in a polyhydric alcohol. In order to dissolve the polyvinyl alcohol in the polyhydric alcohol, the polyvinyl alcohol is added to the polyhydric alcohol and the mixture is heated to a temperature preferably within the range of about 150° C. to about 250° C. to obtain a uniform solution of polyvinyl alcohol and polyhydric alcohol. This uniform solution is then cooled to a temperature within the range of about 120° C. to about 180° C., at which point a solid crystal substance of polyvinyl alcohol precipitates from the solution. The polyvinyl alcohol that precipitates from the solution is white in color and a plate shaped crystal that is substantially fully crystalline and contains hardly any non-crystalline regions. The polyvinyl alcohol crystals may be separated from the polyhydric alcohol solvent by filtration, or extraction techniques may be used to remove the polyhydric alcohol. Organic solvents as methanol or ethanol or propanol may be used as solvents in the extraction procedures to remove the polyhydric alcohol.

In general, any type of polyvinyl alcohol may be used in the inventive procedures and methods of this invention and the degree of polymerization of the polyvinyl alcohol does not present any problems in utilizing the inventive techniques of this invention. In general, polyvinyl alcohol having an average degree of polymerization of about 50 to 5000 is especially suitable and polyvinyl alcohols having a relatively lower degree of polymerization are more adaptable for preparing the crystal form of polyvinyl alcohol of this invention. The polyvinyl alcohol crystals prepared from a polyvinyl alcohol having a lower degree of polymerization are generally preferred for use in the procedures of this invention. Generally, any form of polyvinyl alcohol may be used in the procedures of this invention but it is preferred that the polyvinyl alcohol have a high degree of saponification or a high degree of hydrolysis. Partly saponified polyvinyl alcohol prepared from polyvinyl acetate or prepared from polyvinyl trifluoroacetate may also be used in the procedures and techniques of this invention.

The plate shaped polyvinyl alcohol crystals of this invention may be observed and identified by the use of a microscope. Microscopic examination indicates that the polyvinyl alcohol solids or powders exist in definite individual crystal form or shape and this shape corresponds to an oblong "Tanzaku" (an oblong piece of paper) shape, and where both ends of the individual crystal being slightly pointed and where the crystal appears to have the form or shape of an olive leaf. The individual crystal sizes of the polyvinyl alcohol vary but generally the length of the crystal is within the range of about $1\mu$ to several $\mu$ and the width of the crystal is generally about 0.1 to $0.5\mu$, while the crystal has a thickness generally of about 100 A. to about 300 A. Utilizing X-ray diffraction techniques the X-ray diffraction pattern or X-ray diffraction diagram of the polyvinyl alcohol crystal was technically of a perfect crystal and no blurred diffraction ring or diffraction rings were observed in the X-ray diffraction pattern. The absence of blurred rings in the X-ray diffraction pattern indicates that this form of polyvinyl alcohol crystals do not contain any non-crystalline parts or non-crystalline regions.

The conventional polyvinyl alcohol solid material, including polyvinyl alcohol solid material in the form of fibers which usually have the highest degree of crystallinity, do not have a degree of crystallinity of greater than about 70% when the materials having the highest degree of crystallinity are examined by X-ray diffraction techniques. This material has generally more than about 30% of amorphous regions or amorphous parts and the blurred regions of the X-ray diffraction pattern of this conventional polyvinyl alcohol solid are clear indications of the existence of non-crystalline regions or amorphous regions in the conventional polyvinyl alcohol.

The polyvinyl alcohol crystal particles of this invention have an extremely low degree of solubility in water when the temperature of the water is lower than 100° C. These polyvinyl alcohol crystals are harmless and odorless white colored materials and may be characterized as micro particles. These polyvinyl alcohol particles are useful in many applications in their original form and find further utility when mixed with other materials for other applications. The polyvinyl alcohol crystals of this invention may be readily reduced in particle size by the standard particle size reduction technique and they have a wide range of application when they are in the extremely fine powdered form. The particle size of these extremely fine powders may be varied and it is possible to reduce the average diameter of these particles to a value of less than about 50 A.

The polyvinyl alcohol crystals of this invention are microscopic powders and may be used separately as cosmetic materials or body powders. They may be mixed with materials as calcium carbonate powders, starch, microscopic powders and may be used separately as cosliquids, and perfumes, for use in cosmetic applications. The powders may also be mixed with foods or food materials to provide low calorie foodstuffs. The powders are also useful as catalyst support agents and are also useful as filter aid materials or materials that assist in filtration processes. These powders are also useful in the preparation of coating compositions or paints and also may be added to paper forming materials to form papers and also are useful as coating agents applied on papers. These materials are also useful for the preparation of shaped polymer products as fibers or films or plastic materials.

In manufacturing shaped polymer products as fibers, films, or other plastic materials from polyvinyl alcohol mixtures, it has been found that the improved procedures of this invention overcome the deficiencies and problems discussed above and it has been found that mixtures made from polyvinyl alcohol and polyhydric alcohols have unexpected and valuable advantages and benefits. The polyvinyl alcohol-polyhydric alcohol mixtures unexpectedly result in uniform mixtures that have extremely superior properties.

It has been found that if a polyvinyl alcohol material mixed with a polyhydric alcohol, or a mixture of polyvinyl alcohol and two or more polyhydric alcohols is heated at a temperature within the range of about 140° C. to 260° C., the components of the mixture will be easily or readily dissolved; that is, mutual dissolving takes place and a uniform, colorless, and transparent mixture containing the dissolved polyvinyl alcohol is obtained. Sufficient polyvinyl alcohol is added to the mixture whereby the concentration of polyvinyl alcohol is more than about 30% by weight of the uniform solution. This uniform solution containing more than about 30% polyvinyl alcohol can be extruded through a nozzle, slit, or ejection molding machine to prepare shaped products as filaments, films, or other shaped articles.

The mixtures of polyvinyl alcohol or polyvinyl alcohol derivatives and polyhydric alcohols and containing more than about 30% by weight of polyvinyl alcohol can be heated to a temperature of about 140° C. to 260° C. to obtain easy dissolution of the polyvinyl alcohol and a resultant colorless, transparent solution having a very low viscosity. This solution, if cooled to a temperature of about at least 20° C. below the dissolving temperature will be solidified without the use of any extraction solvent or coagulating agent; and further, by extruding the solution through a nozzle, slit, or an injection molder and by simply cooling, a beautiful filament, film, or shaped article can be manufactured. Also, the filament, film, or shaped articles produced results in no agglutination phenomena and in the case of fibers or filaments the drawing properties are very excellent. Spinning of filaments at high rates of speed of more than 300 meters per minute can be done readily. Polyhydric alcohols useful in the procedures of this invention for the preparation of shaped products include the polyhydric alcohols previously discussed as being useful in the solvent techniques of this invention. Examples of polyhydric alcohols for the shaped product production also include ethylene glycol, diethylene glycol, triethylene glycol, glycerin, pentaerythritol, propylene glycol, trimethylene glycol, tetramethylene glycol, 2,3-butanol, 1,3-butane diol, and 1,2-butane diol. Mixtures of two or more of the polyhydric alcohols may be used. Preferred polyhydric alcohols for the production of shaped products are ethylene glycol, diethylene glycol, and propylene glycol. The uniform polyvinyl alcohol-polyhydric alcohol solution can be used in any of the conventional procedures utilized for the production of shaped polymer products, as spinning or molding. Extrusion of the solution into air or a nitrogen atmosphere can be used; and semi-melt spinning and wet spinning by extrusion into a preferential solvent that dissolves the polyhydric alcohol is also useful. The polyhydric alcohols present in the filaments, films, or other shaped products manufactured by the procedures of this invention act as a plasticizer for the polyvinyl alcohol. If required, the solvents may be removed by evaporation under reduced pressure; or by contacting the shaped article with a preferential solvent, such as water or methanol, which dissolves only the polyhydric alcohol solvent present in the article. In forming the uniform solution, it is desirable not to operate at a temperature higher than about 260° C., as it is possible that carbonization of the polyvinyl alcohol will start occurring at temperatures greater than about 260° C.

This uniform mixture has many advantages over the previous polyvinyl alcohol mixtures and has superior properties when compared to the previous polyvinyl alcohol mixtures. When this unform mixture obtained by heating, is cooled to a temperature of at least more than 20° C. below the temperature at which the complete dissolution occurred, the uniform mixture will be readily solidified. Accordingly, this polyvinyl alcohol-polyhydric alcohol mixture is useful for the manufacture of shaped polymer products as fibers, films, or other plastic materials. In producing polyvinyl alcohol fibers the polyvinyl alcohol-polyhydric alcohol mixture is used as a spinning solution and the uniform mixture is spun or extruded through conventional fiber forming apparatus. Immediately after the spinning step, the formed fibers are reduced in temperature to at least about 20° C. below the temperature at which complete dissolution took place to form the uniform mixture. This temperature reduction step or cooling step results in solidified polyvinyl alcohol fibers that do not show any agglutination phenomenon.

As previously indicated when utilizing polyvinyl alcohol-water mixtures for shaped polymer product production; the water is removed after the product forming step; however, utilizing the polyvinyl alcohol-polyhydric alcohol mixtures of this invention does not require that the polyhydric alcohol be removed; as the polyhydric alcohol will function as a plasticizer for the polyvinyl alcohol.

Polyvinyl alcohol obtained by cooling of this mixture is in perfect crystal form. The crystal form of polyvinyl alcohol being entirely different from that observed when polyvinyl alcohol shaped polymer products as fibers or films are subjected to thermal elongation or heat treatment. This crystal form of polyvinyl alcohol is similar to that observed in the case of crystals of low molecular weight substances. The crystal polyvinyl alcohol of this invention has a higher regular crystal habit and form and is a plate-shaped crystal surrounded by a (100) plane, (101) plane, and (020) plane. In the polyvinyl alcohol crystals of this invention the polyvinyl alcohol molecular chains are folded in the manner of hairpins in a direction perpendicular to the platelet of single crystals. Examination of the polyvinyl alcohol crystal by X-ray diffraction techniques indicates no reflection in the X-ray diffraction pattern due to the presence of non-crystalline portions or parts. The Debye-Scherrer rings are very distinct. Such distinct Debye-Scherrer rings have not been observed in any of the previously prepared conventional and usual polyvinyl alcohol fibers and films. It appears that because of the crystal nature of the polyvinyl alcohol shaped polymer products, as fibers, films, or other plastic materials spun or molded or formed from this polyvinyl alcohol-polyhydric alcohol mixture, when examined by X-ray diffraction techniques will have X-ray diffraction patterns that have more than 10 sharp X-ray diffraction lines and these X-ray diffraction patterns obtained have more than 10 sharp X-ray diffraction lines observed in shaped polymer products that have not been subjected to any treatments to increase the degree of crystallinity as thermal elongation or heat treatment. Also, it appears that the junction points between polyvinyl alcohol molecules and the polyvinyl alcohol crystal material of this invention are vary few in number and accordingly drawing or elongation of fiber or film type materials may be accomplished easily; for example, in the case of a fiber prepared in accordance with the inventive procedures of this invention, the fiber may be drawn or elongated in amount of more than 10 times its original length. The phenomenon of necking is observed when these polyvinyl alcohol fibers are drawn or elongated and the phenomenon has not previously been observed in the polyvinyl alcohol fibers prepared by the conventional procedures. Polyvinyl alcohol fibers prepared by the procedures of this invention have a strength of more than 10 g./d. and have a Young's modulus of from about 350 g./d. to about 400 g./d.; and these fibers have extremely excellent physical properties and extremely excellent mechanical properties.

As indicated, the procedures of this invention are applicable to polyvinyl alcohol and polyvinyl alcohol derivatives, included are fully or perfectly saponified polyvinyl alcohol, partially saponified polyvinyl alcohol, polyvinyl alcohol acetalized with aldehydes, ketalized polyvinyl alcohol, the reaction product of polyvinyl alcohol with urea or derivatives of urea, and esterified products of polyvinyl alcohol. Further, polyvinyl alcohol having a high degree of steroregularity may also be used, as the polyvinyl alcohol that has been derived from polyvinyl esters produced by low temperature polymerization of vinyl esters. Polyvinyl alcohol having a low degree of polymerization or a high degree of polymerization may also be used without any modification of the inventive procedures of this invention. Further, mixtures of polyhydric alcohols may be used and more than two polyhydric alcohols may be used in the polyhydric alcohol mixture.

Generally, in producing the uniform polyvinyl alcohol-polyhydric alcohol mixture of this invention it is preferred that heating to a temperature of at least 140° C. be used. Generally, a temperature from about 140° C. to about 260° C. is preferred. The temperature of heating may vary somewhat depending upon the particular components in the mixture and the requirement of obtaining the uniform mixture. While temperatures above 260° C. may be used, it is generally not desirable or practical as these higher temperatures may result in decomposition reactions and therefore extremely high temperatures should be avoided. The temperature required for the preparation of the uniform mixture will vary depending on the amount of polyvinyl alcohol and polyhydric alcohol.

Generally, any amount of polyvinyl alcohol may be mixed with the polyhydric alcohols to obtain the uniform mixture of this invention; however, for commercial operations and practical considerations as in the manufacture of fibers, films, or plastic materials, it is preferred and desirable that the concentration of the polyvinyl alcohol be from about 30% by weight to about 80% by weight based on the weight of the entire mixture.

The solutions prepared from polyvinyl alcohol and acid amides may also be used for the production of polyvinyl alcohol shaped products as fibers or films, by using the procedures described above.

The following examples are illustrative of the inventive materials, compositions, articles, mixtures, procedures, methods, and techniques of this invention, and are not intended to limit the scope or area of the invention.

EXAMPLE 1

Polyvinyl acetate polymer was prepared by polymerizing vinyl acetate monomer at 60° C. The polyvinyl acetate was then saponified, utilizing conventional saponification procedures and using caustic soda as the saponification catalyst. The polyvinyl alcohol obtained after saponification had a viscosity average degree of polymerization of 1730 or an average degree of polymerization of 1730. The degree of saponification or degree of hydrolysis of this polyvinyl alcohol was 99.57%. The degree of saponification or the degree of hydrolysis relates to the amount of the polyvinyl acetate polymer that has been converted to polyvinyl alcohol and this percentage value or degree of saponification is the mole percent of the vinyl acetate units in the polyvinyl acetate that has been converted to vinyl alcohol units.

The polyvinyl alcohol was then washed and dried. One part by weight of polyvinyl alcohol was added to 100 parts by weight of 1,5-pentadiol and this mixture was heated to about 200° C., whereby the polyvinyl alcohol was completely dissolved and a uniform solution was obtained. The uniform solution was cooled to a temperature of about 170° C. and polyvinyl alcohol precipitated from the solution. The precipitated polyvinyl alcohol was recovered by conventional filtration techniques. The polyvinyl alcohol powders recovered by filtration retained a small amount of the 1,5-pentadiol solvent. The polyvinyl alcohol powders were then immersed in a large quantity of ethanol to remove the retained solvent, by extraction. The polyvinyl alcohol powders were removed from the extraction mixture and were dried. The dried polyvinyl alcohol powders were white crystal powders. These dried white crystal powders were plate-shaped crystals having a perfect crystal form or crystal shape. The crystals had varying dimensions, but generally, the crystals had a length from about 2µ to about 5µ and had a width of about 0.5µ to about 1µ, and had a thickness of about 100 A. These polyvinyl alcohol crystal powders did not dissolve in boiling water.

The polyvinyl alcohol crystal powders were ground or pulverized and a polyvinyl alcohol having a still finer particle size was obtained. The fine particles of polyvinyl alcohol were mixed with pulverized zinc oxide, starch, boric acid powder or talc, and there were obtained powder mixtures that are cosmetic type mixtures or skin adjusting agents or skin treating agents having properties quite similar to the well-known "baby powders."

EXAMPLE 2

Polyvinyl alcohol was added to a mixture of polyhydric alcohols. The polyvinyl alcohol used at a high degree of stereoregularity due to its molecular structure and the degree of stereoregularity was higher than the degree of stereoregularity of the ordinary or conventional polyvinyl alcohol. The polyvinyl alcohol had a viscosity average polymerization degree of 3300 and a high degree of saponification, that is, saponification was almost complete. Thirty parts by weight of the polyvinyl alcohol were added to the polyhydric alcohol mixture which consisted of 35 parts by weight of triethylene glycol and 35 parts by weight of diethylene glycol; mixing was used to obtain a uniform mixture. The uniform mixture was then heated to a temperature of about 200° C. and the polyvinyl alcohol completely dissolved in the polyhydric alcohol solvent mixture and a uniform solution was obtained. This uniform solution had a viscosity value of about 80 poises, which is an extremely low viscosity value when compared with the viscosity values observed when water is used as a solvent to prepare solutions of polyvinyl alcohol. The uniform solution of the polyvinyl alcohol and the polyhydric alcohol mixture was then cooled to about 170° C. and polyvinyl alcohol powders or polyvinyl alcohol particles were precipitated from the solution. The polyvinyl alcohol powders were recovered and the retained polyhydric alcohol solvent mixture was extracted by immersion of the polyvinyl alcohol powders in ethanol. The polyvinyl alcohol powders obtained after extraction were plate-shaped crystals having a remarkably distinct X-ray diffraction pattern and practically no reflection due to a non-crystalline portion. Reflection is observed when non-crystalline portion or non-crystalline parts are present in the polyvinyl alcohol polymer and when practically no reflection is observed it is an indication that the amount or degree of non-crystalline area is very small or negligible.

These plate-shaped crystal powders of polyvinyl alcohol were used to make a foodstuff or bread-type material. The powders were mixed with wheat powders and other bread-making constitutents and baked into a bread type material using conventional baking procedures. The bread obtained had a somewhat whitish color and is useful as a low calorie foodstuff or a low calorie bread type material.

EXAMPLE 3

Starting with polyvinyl trifluoroacetate, polyvinyl alcohol was prepared by saponification of the polyvinyl trifluoroacetate, using caustic soda as the saponification catalyst. The prepared polyvinyl alcohol had a viscosity average degree of polymerization of 350 and a degree of hydrolysis or degree of saponification of 98.7%. One part by weight of the polyvinyl alcohol, obtained by saponification, was added to 30 parts by weight of triethylene glycol, and this mixture was heated to about 210° C., to obtain complete dissolution of the polyvinyl alcohol and a uniform solution. The uniform solution was then cooled to about 180° C., and polyvinyl alcohol solids or polyvinyl alcohol particles were precipitated from the solution. The polyvinyl alcohol solids were recovered and placed in a vacuum dryer at a temperature of 80° C. and dried; white powders of polyvinyl alcohol were obtained after drying. These polyvinyl alcohol powders were regular plate-shaped crystals having a definite crystal structure or crystal form. The polyvinyl alcohol powder having this crystal form had an extremely high degree of water-resistance. This polyvinyl alcohol was useful in preparing coating compositions or paints.

EXAMPLE 4

Polyvinyl acetate was prepared by polymerizing vinyl acetate monomer at 60° C., and was then used to prepare, by saponification, polyvinyl alcohol having a degree of polymerization of about 1700. One part by weight of the polyvinyl alcohol was mixed with 10 parts by weight of dimethyl formamide and the mixture was heated; at a temperature of about 140° C. the polyvinyl alcohol began to dissolve and at a temperature of about 150° C., the polyvinyl alcohol was completely dissolved. The solution was cooled to about 120° C. and the entire solution was solidified into a single solid mass. This solid mass was compressed and as a result the dimethyl formamide solvent was separated from the polyvinyl alcohol. The polyvinyl alcohol solids obtained were then washed with water or methanol. The washed polyvinyl alcohol solids were pure and had the form of microscopic powders.

EXAMPLE 5

Vinyl acetate monomer was polymerized at a temperature of −40° C. and polyvinyl acetate polymer was obtained. The polyvinyl acetate was saponified to prepare a polyvinyl alcohol having an average degree of polymerization of about 2600. One part by weight of this polyvinyl alcohol was mixed with 100 parts by weight of diethyl formamide and the mixture was heated to 205° C. and the polyvinyl alcohol was completely dissolved within 30 minutes of heating at this temperature. The solution was cooled to 180° C., at which point the solution became cloudy and crystal substances or crystal particles were precipitated from the solution. Further cooling of the cloudy solution to room temperature did not result in any change in the appearance of the solution. The precipitated polyvinyl alcohol crystals were recovered and were examined by electron microscopic observation. The polyvinyl alcohol crystals were parallelogram plate, and had a regular crystal structure and the individual crystals were generally about 100 A. thick and had a width of about $0.5\mu$ and a length of about $3\mu$. These polyvinyl alcohol crystals did not dissolve in boiling water and were easily pulverized or ground to extremely fine granules having a particle size of 350 mesh or more, as described in the previous example. The melting point of these polyvinyl alcohol crystals, as measured by differential thermal analysis was 237° C. The finely ground particles prepared from the polyvinyl alcohol crystals were used directly as cosmetic materials or skin drying agents.

EXAMPLE 6

Polyvinyl acetate polymer was prepared by polymerizing vinyl acetate monomer at 60° C. The polyvinyl acetate was saponified utilizing conventional saponification procedures and there was obtained a polyvinyl alcohol having an average degree of polymerization of 1600 and a degree of hydrolysis or degree of saponification of 99%. The polyvinyl alcohol was dried and one part by weight of the dried polyvinyl alcohol was added to 100 parts by weight of triethylene glycol. This mixture was then heated whereby the polyvinyl alcohol was completely dissolved at a temperature of about 210° C. The uniform solution was cooled to about 180° C. and polyvinyl alcohol solids precipitated from the solution in the form of a fine powder. The precipitated polyvinyl alcohol was recovered from the triethylene glycol by filtration and the recovered polyvinyl alcohol was in the form of crystals. The heating temperature and the heating time do not materially affect the degree of crystallinity of the polyvinyl alcohol and do not materially affect the crystal form of the polyvinyl alcohol obtained.

EXAMPLE 7

Vinyl trifluoroacetate monomer was polymerized at a temperature of 30° C. to produce polyvinyl trifluoroacetate polymer. Polyvinyl alcohol was then prepared by saponifying the polyvinyl trifluoroacetate; the prepared polyvinyl alcohol had an average degree of polymerization of 370. One part by weight of polyvinyl alcohol was added to 30 parts by weight of 1,5-pentadiol and the mixture was heated to about 190° C. to dissolve the polyvinyl alcohol. The solution was cooled to about 170° C. and polyvinyl alcohol crystals were precipitated. The precipitated polyvinyl alcohol crystals were in the form of regular plate-shaped crystals having a definite crystal structure or crystal shape or form.

Polyvinyl alcohol obtained by saponifying polyvinyl trifluoroacetate will not readily dissolve in water, whereas water is a good solvent for the ordinary or conventional form of polyvinyl alcohol. As shown by this example, however, polyvinyl alcohol may be readily and easily dissolved in polyhydric alcohols and by cooling the solution obtained one may obtain polyvinyl alcohol solids in crystal form.

EXAMPLE 8

Polyvinyl acetate polymer was produced by polymerizing vinyl acetate monomer at a temperature of 0° C. Utilizing conventional saponification procedures, polyvinyl alcohol was prepared from the polyvinyl acetate. The thus prepared polyvinyl alcohol had an average degree of polymerization viscosity of 3300. Thirty parts by weight of the polyvinyl alcohol were added to a polyhydric alcohol mixture consisting of 35 parts by weight of triethylene glycol and 35 parts by weight of diethylene glycol and then heated to a temperature of about 200° C. to obtain a clear solution. The viscosity of this solution was about 80 poises and was remarkably low when compared to the viscosity in the case where water is used as a solvent for the polyvinyl alcohol. When the uniform solution of polyvinyl alcohol in the polyhydric alcohol mixture was cooled to about 170° C., polyvinyl alcohol crystals precipitated readily from the solution. The polyvinyl alcohol crystals were recovered and the retained polyhydric alcohols were extracted by immersing the polyvinyl alcohol crystals in ethanol. The X-ray diffraction patterns of the polyvinyl alcohol crystals were remarkably clear and practically no reflection due to the presence of non-crystallized areas or portions or parts was observed. The crystals of polyvinyl alcohol were readily reduced to solids having an extremely small particle size. Conventional particle size reduction apparatus and procedures were used to prepare microscopic granules from the polyvinyl alcohol crystals; microscopic granules of polyvinyl alcohol having a particle size of 350 mesh or more were readily prepared.

EXAMPLE 9

Polyvinyl alcohol prepared by the procedures described in Example 6 was added to glycerin; utilizing one part by weight of polyvinyl alcohol to 30 parts by weight of glycerin. The mixture was heated and the polyvinyl alcohol was completely dissolved at a temperature of about 165° C. This uniform solution was added to a large quantity of propyl alcohol and heated to 165° C. under pressure and as a result polyvinyl alcohol precipitated from the mixture. The precipitated polyvinyl alcohol was in the form of plate-shaped crystals.

This method of preparing polyvinyl alcohol in crystal form from a solution of polyvinyl alcohol and polyhydric alcohols or acid amides is another method of preparing these crystals and may be used instead of the previously described methods of cooling the uniform solution of polyvinyl alcohol. One may obtain precipitation of the polyvinyl alcohol crystals by adding the solution to an organic solvent that is a non-solvent for the polyvinyl alcohol, but is an extraction solvent for the polyhydric alcohol or the acid amide.

EXAMPLE 10

Polyvinyl trifluoro acetate was prepared by polymerizing vinyl trifluoro acetate monomer at a polymerization temperature of 30° C. The polyvinyl trifluoroacetate was then saponified by conventional saponification procedures to prepare polyvinyl alcohol; and the polyvinyl alcohol prepared in this manner had an average degree of polymerization of 370, and was insoluble in water. Seventy-five parts by weight of this polyvinyl alcohol were added to 25 parts by weight of a polyhydric alcohol mixture; the polyhydric alcohol mixture consisted of diethylene glycol and triethylene glycol with a weight ratio of 3 parts of diethylene glycol to 7 parts of triethylene glycol. The polyvinyl alcohol and polyhydric alcohol mixture was thoroughly mixed and a uniform mixture was obtained. This mixture was heated to about 220° C. to dissolve the polyvinyl alcohol. A clear solution was obtained and was a colorless, transparent solution. Polyvinyl alcohol was then solidified from this solution and this polyvinyl alcohol had sharp X-ray diffraction lines.

EXAMPLE 11

Vinyl acetate monomer was polymerized at 0° C. and polyvinyl acetate was obtained. The polyvinyl acetate was then saponified to prepare polyvinyl alcohol having an average degree of polymerization of about 1600. The polyvinyl alcohol had an extremely high degree of stereoregularity. The polyvinyl alcohol was then dried using drying temperatures of about 100° C. Seventy parts by weight of the dried polyvinyl alcohol were mixed with 30 parts by weight of triethylene glycol and the mixture was then thoroughly stirred until a uniform mixture was obtained. The uniform mixture was then heated to about 200° C. and a clear solution resulted from the dissolving of the polyvinyl alcohol. The clear solution was colorless and transparent and was a uniform solution. Polyvinyl alcohol was solidified from this uniform solution and was similar to the polyvinyl alcohol prepared in Example 1 and had sharp X-ray diffraction lines.

EXAMPLE 12

Polyvinyl alcohol was prepared by first polymerizing vinyl acetate monomer at a polymerization temperature of 30° C. to prepare polyvinyl acetate and then saponifying the polyvinyl acetate to produce polyvinyl alcohol having a high degree of polymerization. The average degree of polymerization of the polyvinyl alcohol produced was about 3300. The polyvinyl alcohol was then dried at a temperature of 100° C. Sixty-five parts by weight of the polyvinyl alcohol were added to 35 parts by weight of diethylene glycol and the mixture obtained was thoroughly stirred to obtain a uniform mixture. This uniform mixture was heated and the polyvinyl alcohol was dissolved. Heating to a temperature of about 180° C. was required for complete dissolution of the polyvinyl alcohol and a uniform clear solution was obtained that was a colorless and transparent solution. This uniform clear solution was extruded or spun into the atmosphere to form a polyvinyl alcohol fiber. The atmosphere was at room temperature and extrusion was through a nozzle or opening of 0.08 mm. in diameter. After extrusion into the atmosphere the fiber was passed through an ethanol bath; the time of passage through the ethanol bath was 6 seconds. The diethylene glycol in the spun fiber was removed by the passage of the fiber through the ethanol bath. After the diethylene glycol had been removed the fiber was elongated in a heated chamber containing air at 190° C. The fiber was elongated to the extent of 10 times its original length. Tests indicated that the elongated fibers had a strength of 12 g./d. and a Young's modulus of 390 g./d.

EXAMPLE 13

Polyvinyl alcohol was prepared according to the procedures of Example 12 and the polyvinyl alcohol had an average degree of polymerization of about 3300. The polyvinyl alcohol was washed and dried. Sixty-five parts by weight of the polyvinyl alcohol were added to 35 parts by weight of diethylene glycol and the mixture was thoroughly mixed. The mixture was then heated to 180° C. and a colorless transparent solution was obtained; the solution was then extruded through a slit, of 0.5 mm. thickness, into air. Film obtained by this extrusion process was dipped into a methanol bath for extraction of the diethylene glycol; and the film was then stretched to an extent of about 8 times its original length.

EXAMPLE 14

Polyvinyl acetate was prepared by polymerizing vinyl acetate monomer at a temperature below 0° C. This polyvinyl acetate was then saponified and a polyvinyl alcohol having an average degree of polymerization of about 1600 was obtained. The polyvinyl alcohol was washed and dried. A mixture containing 70 parts by weight of polyvinyl alcohol and 30 parts by weight of triethylene glycol was thoroughly agitated and then heated at a temperature of 200° C. until the polyvinyl alcohol dissolved to form a colorless, transparent, and homogeneous solution. Filaments of polyvinyl alcohol were prepared by extruding the homogeneous solution through a spinnerette, of 0.08 mm. diameter, into air at room temperature.

The polyvinyl alcohol filament obtained had good drawability and the filaments did not agglutinate or stick together; these polyvinyl alcohol filaments gave sharp X-ray diffraction patterns and were insoluble in water. Variations in the air temperature in the extrusion process had no effect on the polyvinyl alcohol filament properties.

While preferred embodiments of the invention have been described and illustrated, it is to be understood that widely different modifications of the invention may be made without departing from the scope and spirit of the invention. The invention is not to be limited by the foregoing examples and illustrations and descriptive details except as defined in the following claims.

We claim:

1. Polyvinyl alcohol crystals having a crystal habit.
2. Polyvinyl alcohol solids having a crystal habit and having a high degree of crystallinity and containing substantially no amorphous regions.
3. Polyvinyl alcohol solid crystals being substantially fully crystalline and containing no amorphous regions and where said polyvinyl alcohol crystals may be readily reduced to microscopic particles.
4. Polyvinyl alcohol solids having a plate shape crystal form and capable of being readily reduced to microscopic granules.
5. Polyvinyl alcohol crystals having a general plate-like parallelogram structure and where the individual crystal dimensions are about $0.5\mu$ to about $1\mu$ in width, about $2\mu$ to about $5\mu$ in length, and about 100 A. to about 300 A. in thickness.
6. Polyvinyl alcohol crystals having a general plate-like parallelogram structure and where the individual crystal dimensions are about $0.5\mu$ to about $1\mu$ in width, about $2\mu$ to about $5\mu$ in length, and about 100 A. to about 300 A. in thickness, and where the polyvinyl alcohol crystal is bounded by a (100) plane, a (101) plane, and a (020) plane, and where the polyvinyl alcohol crystals may be readily reduced to extremely fine powders having a particle size of more than 350 mesh.
7. A mixture of polyvinyl alcohol plate shaped crystal powders wherein said polyvinyl alcohol is substantially fully crystalline and contains substantially no amorphous regions and where said polyvinyl alcohol crystal powders may be readily reduced to microscopic particles of more than 350 mesh.

8. A mixture according to claim 7, wherein said polyvinyl alcohol crystals are about 0.5μ to about 1μ in width, about 2μ to about 5μ in length, and about 100 A. to about 300 A. in thickness.

9. A mixture comprising finely ground particles of polyvinyl alcohol crystals having a particle size more than about 350 mesh.

10. A method of manufacturing solid polyvinyl alcohol in crystal form which comprises dissolving polyvinyl alcohol in a polyhydric alcohol having the formula HO—(C$_x$H$_y$O$_z$)—OH where $x$ is from 2 to 10, $y$ is from 4 to 20, and $z$ is from 0 to 10,
to produce a uniform solution and then changing the solubility characteristics of the solution to precipitate crystals of polyvinyl alcohol.

11. A method of manufacturing solid polyvinyl alcohol in crystal form which comprises heating a mixture of polyvinyl alcohol and a polyhydric alcohol having the formula HO—(C$_x$H$_y$O$_z$)—OH where $x$ is from 2 to 10, $y$ is from 4 to 20, and $z$ is from 0 to 10, until said polyvinyl alcohol dissolves and a uniform solution is obtained,
and cooling said solution to form polyvinyl alcohol crystals.

12. A method of preparing solid polyvinyl alcohol in crystal form comprising dissolving polyvinyl alcohol in a polyhydric alcohol having the formula HO—(C$_x$H$_y$O$_z$)—OH where $x$ is from 2 to 10, $y$ is from 4 to 20, and $z$ is from 9 to 10, to obtain a uniform solution,
and removing said polyhydric alcohol to form solid crystals of polyvinyl alcohol.

13. A method of preparing solid polyvinyl alcohol in crystal form and having a high degree of crystallinity which comprises heating a mixture of polyvinyl alcohol and a polyhydric alcohol solvent having the formula HO—(C$_x$H$_y$O$_z$)—OH where $x$ is from 2 to 10, $y$ is from 4 to 20, and $z$ is from 0 to 10, until said polyvinyl alcohol in said mixture is dissolved and a uniform solution is obtained,
and treating said heated uniform solution with an extraction solvent for said polyhydric alcohol solvent to obtain polyvinyl alcohol crystals, said extraction solvent being a preferential solvent for the polyhydric alcohol solvent and said polyvinyl alcohol being essentially insoluble in said extraction solvent.

14. A method of preparing crystals of polyvinyl alcohol having a high degree of crystallinity which comprises forming a mixture of polyvinyl alcohol and an acid amide having the formula

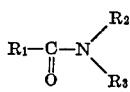

where R$_1$, R$_2$, and R$_3$ are hydrogen, methyl, or ethyl radicals, heating said mixture to a temperature of about 120° C. to completely dissolve said polyvinyl alcohol in said mixture to obtain a uniform solution of said polyvinyl alcohol and said acid amide, and treating said heated uniform solution to obtain polyvinyl alcohol crystals.

15. A process according to claim 14 where said heated uniform solution is cooled to precipitate said polyvinyl alcohol crystals.

16. A method according to claim 14 where said heated uniform solution is subjected to distillation to remove said acid amide solvent.

17. A method according to claim 14 where said heated uniform solution is treated with an extraction solvent for said acid amide, said extraction solvent being a preferential solvent for said acid amide and said polyvinyl alcohol being essentially insoluble in said extraction solvent.

18. A method of preparing polyvinyl alcohol shaped products comprising heating a mixture of polyvinyl alcohol and a polyhydric alcohol having the formula HO—(C$_x$H$_y$O$_z$)—OH where $x$ is from 2 to 10, $y$ is from 4 to 20, and $z$ is from 0 to 10, at a temperature sufficient to produce a clear solution, said temperature being in the range of about 140 to 260° C., said polyvinyl alcohol being present in said uniform solution in an amount greater than about 30% by weight of said solution, forming said polyvinyl alcohol products from said uniform solution, and cooling said products to a temperature at least 20° C. below the temperature to which the said mixture is heated, whereby the product solidifies.

19. A method according to claim 18, wherein said polyhydric alcohol is removed from said polyvinyl alcohol after said cooling of said polyvinyl alcohol product.

20. A method of preparing polyvinyl alcohol shaped products comprising heating a mixture of polyvinyl alcohol and a polyhydric alcohol having the formula HO—(C$_x$H$_y$O$_z$)—OH where $x$ is from 2 to 10, $y$ is from 4 to 20, and $z$ is from 0 to 10, at a temperature within the range of about 140° C. to about 230° C. to form a uniform solution, said polyvinyl alcohol in said solution being present in an amount greater than about 30% and up to about 80% by weight of said solution, forming said polyvinyl alcohol product from said solution, and cooling said products to a temperature at least 20° C. below the temperature to which the said mixture is heated, whereby the product solidifies.

21. A method of making polyvinyl alcohol fibers having a high degree of crystallinity which comprises heating a mixture of polyvinyl alcohol and a polyhydric alcohol solvent having the formula HO—(C$_x$H$_y$O$_z$)—OH where $x$ is from 2 to 10, $y$ is from 4 to 20, and $z$ is from 0 to 10, at a temperature sufficient to obtain a uniform solution, said solution containing about 30 to 80% by weight of polyvinyl alcohol, said temperature being in the range of about 140 to 260° C., preparing polyvinyl alcohol fibers from said solution by spinning, cooling said fibers to a temperature at least 20° C. below the temperature to which the mixture is heated and sufficient to solidify the solution, and removing said polyhydric alcohol from said spun fibers to prepare polyvinyl alcohol fibers having a high degree of crystallinity.

22. A method of manufacturing polyvinyl alcohol fibers, which comprises dissolving polyvinyl alcohol in a polyhydric alcohol having a general formula HO—(C$_x$H$_y$O$_z$)—OH where $x$ is from 2 to 10, $y$ is from 4 to 20 and $z$ is from 0 to 10, at a temperature of from about 140 to 260° C., and sufficient to obtain a uniform solution, said uniform solution containing about 30 to 80% by weight of polyvinyl alcohol, preparing polyvinyl alcohol fibers from said solution by spinning, cooling the fibers to a temperature at least 20° C. below the temperature to which the solution is heated, and removing said polyhydric alcohol from said spun fibers by extraction with a solvent selected from the group consisting of methanol, ethanol and propanol, to produce polyvinyl alcohol fibers being substantially fully crystalline.

23. The method of claim 13 wherein said extraction solvent is selected from the group consisting of methanol, ethanol and propanol.

24. The method of claim 14 wherein the acid amide is diethyl formamide.

25. The method of claim 14 wherein the acid amide is dimethyl formamide.

26. The method of claim 12 wherein the polyhydric alcohol is triethylene glycol.

27. The method of claim 12 wherein the polyhydric alcohol is pentamethylene glycol.

28. The method of claim 12 wherein the polyhydric alcohol is hexamethylene glycol.

29. The method of claim 12 wherein the polyhydric alcohol is ethylene glycol.

30. The method of claim 12 wherein the polyhydric alcohol is diethylene glycol.

31. The method of claim 12 wherein the polyhydric alcohol is propylene glycol.

32. The method of claim 17 wherein the extraction solvent is ethanol.

33. The method of claim 19 wherein the polyhydric alcohol is removed by evaporation.

34. The method of claim 19 wherein the polyhydric alcohol is removed by contacting the shaped article with a preferential solvent which dissolves only the polyhydric alcohol solvent present in the article.

35. The method of claim 34 wherein the preferential solvent is selected from the group consisting of water and methanol.

References Cited

UNITED STATES PATENTS 2,388,325  11/1945  Houtz _____ 18—54

FOREIGN PATENTS 538,782  12/1955  Belgium.

OTHER REFERENCES

Polymerization by Organometallic Compounds, Reich & Schindler, Interscience, New York (1966), pp. 77, 94–99, and 113–114 relied on.

JOSEPH L. SCHOFER, Primary Examiner.

S. M. LEVIN, Assistant Examiner.

U.S. Cl. X.R.

264—203; 99—90; 117—152, 139.5; 424—69, 78

PO-1050
(5/69)

UNITED STATES PATENT OFFICE
CERTIFICATE OF CORRECTION

Patent No. 3,427,298      Dated February 11, 1969

Inventor(s) K. Tsuboi et al

It is certified that error appears in the above-identified patent and that said Letters Patent are hereby corrected as shown below:

Column 3, line 42, -- and -- should be inserted after "water".
Column 10, line 57, before "powders" should read -- cellulose --
"may be used separately as cos-" should be deleted; line 58,
before "liquids" should read -- organic and inorganic --.
Column 11, line 31, "articles" should read -- article --.
Column 12, line 45, before "observed" should be -- are --;
line 58, "the" should read -- this --. Column 19, line 34, "9"
should read -- 0 --.

SIGNED AND
SEALED
APR 28 1970

(SEAL)
Attest:

Edward M. Fletcher, Jr.
Attesting Officer

WILLIAM E. SCHUYLER, JR.
Commissioner of Patents